United States Patent Office 3,025,236
Patented Mar. 13, 1962

3,025,236
FLOCCULATION OF SOLIDS
Herbert M. Barrett and Charles A. Sauber, Bartlesville, Okla., assignors to Phillips Petroleum Company, a corporation of Delaware
No Drawing. Filed Apr. 10, 1959, Ser. No. 805,354
26 Claims. (Cl. 252—8.5)

This invention relates to the flocculation of solids suspended in a liquid medium. In another aspect, it relates to a method of flocculating a clay solids colloidally suspended in a fluid such as those fluids used in drilling oil and gas wells, or other deep wells. In a further aspect, it relates to a method for improving the flow properties or rheological characteristics of a drilling fluid. In a further aspect, it relates to drilling fluids, such as the water base type and the emulsion type, containing clay solids colloidally suspended therein.

In the art of drilling wells for oil and gas, especially by the rotary method, it is necessary to use a drilling fluid, as is well known in the art. The drilling fluid is customarily circulated down through a long string of drill pipe in the well and up to the surface in the annulus between the well and the drill string. The drilling fluid, which generally contains suspended colloidal material such as clays, or "drilling mud," performs several important functions. The drilling fluid lubricates the drill string, cools the drilling bit, carries drilled formation solids or cuttings to the surface of the well, forms or deposits on the wall of the well a relatively thin filter cake to prevent the loss of any substantial amounts of liquid from the drilling fluid during the drilling operation, maintains a hydrostatic differential pressure to consolidate the formation and prevent its caving and also to counteract formation pressures, as well as other useful functions. In order to perform these important functions properly, the drilling fluid or mud must have desirable flow properties or rheological characteristics, such as viscosity, gel strength, low water loss properties, and the like.

The drilling fluids comprise a liquid medium, such as water or oil, and suspended solids, such as native clays, drilled formation solids, or concentrated colloidal clays such as bentonite. During the drilling operation, the drilling fluid picks up formation solids or cuttings, sand, and the like. The coarse solids are generally removed from the drilling fluid by passing the latter from the well over a vibrating screen or shale shaker, or the solids are removed by passing the drilling fluid to a settling tank. The presence of such solids in drilling fluids generally has a direct effect on the flow properties of the drilling fluid. Therefore, the control of the solids content of a drilling fluid is of primary concern in the drilling of oil and gas wells, or other deep wells.

Several methods have been devised in the past for controlling the solids content of drilling fluids, particularly when it is desired to employ a relatively low solids drilling fluid. Chief among these conventional methods of controlling solids content are those which include dilution of the drilling fluid with water, adding air to the drilling fluid to lower its weight, centrifuging the drilling fluid to remove undesirable clay solids, and the use of flocculents to flocculate undesirable solids and cause them to settle. The advantages of drilling with a relatively low solids drilling fluid or mud include increased penetration rates, decrease in the number of bits required, reduced wear and tear of the drilling rig, lower overall mud costs, and minimized lost circulation.

The subject invention in one of its more important aspects is concerned with the control of the solids content of a drilling fluid, particularly low solids drilling fluids, by the use of flocculents. While many of the flocculents proposed heretofore for flocculating and removing solids from suspension have been used successfully, many of these conventional flocculents have certain limiting features. Many of them tend to decrease in effectiveness to an uneconomical point with an increase in solids in suspension. Others are effective only over a relatively long period of time, requiring settling times longer than the residence time of the solids suspension in the settling area. Other flocculents have limited application in that the flocculated system excessively redisperses on agitation. Still other flocculents are not effective in removing solids from oil and water emulsions, such as emulsion drilling fluids.

Accordingly, an object of this invention is to provide an improvement in flocculating solids suspended in a liquid medium. Another object is to provide an improved method of flocculating clay solids colloidally suspended in a fluid such as that used in drilling oil and gas wells, or other deep wells. Another object is to treat a drilling fluid in such a manner as to remove undesirable suspended solids and thereby improve the flow properties of the drilling fluid. Another object is to provide improved drilling fluids, such as the water base type and the emulsion type, containing controlled and desirable amounts of suspended solids, such as colloidal clays and the like. Another object is to improve the rheological properties of a drilling fluid or the like. Another object is to cause effective flocculation and sedimentation or settling of suspended solids in a liquid medium, despite an increase in the amount of solids. Another object is to increase the settling rate of a flocculated system. Another object is to increase the flocculation efficiency of a flocculent in a liquid medium containing suspended colloidal solids. Another object is to flocculate a solids suspension in such a manner that the flocculation remains effective even after vigorous agitation of the flocculated system. Another object is to flocculate colloidal solids suspended in a water base drilling mud with an improved flocculating agent. Further objects and advantages of this invention will become apparent to those skilled in the art from the following discussion and appended claims.

We have now discovered that the flocculation of colloidal solids suspended in a fluid medium, such as a water base or emulsion drilling fluid, can be readily effected by adding to the suspension a relatively small but effective amount of (1) guar flour or a high molecular weight acrylamide polymer, such as polyacrylamide or a copolymer of acrylamide and a copolymerizable carboxylic acid, such as acrylic acid, and, in addition, (2) the sodium salt of sulfonated dodecyl diphenyl oxide, the flocculent agent of this invention hereinafter termed a two-component agent.

The subject invention finds particularly utility in the treatment of well drilling fluids, such as water base drilling fluids and oil-in-water emulsion drilling fluids, and the subject invention will be described in relation thereto; however, it should be understood that the subject invention is not to be unduly limited to this field of utility, it having utility and applicability in any solids suspension system.

As mentioned hereinbefore, a drilling fluid comprises a fluid medium, such as water or oil, and suspended solids. Such suspended solids can be broadly classified in two groups: non-colloidal solids such as sand and weighting material, and colloidal solids such as clays, diatomaceous earth, organic colloids, such as carboxymethylcellulose (CMC), and the like. It is this latter class of solids, that is, the colloidal materials, which are generally difficult to remove from the drilling fluid. Although prior art methods for controlling the solids content of a drilling fluid, such as water dilution, aeration, centrifugation, and other mechanical methods, are useful in removing the non-colloidal solids, they are often ineffective in removing the colloidal solids from the drilling fluid.

The colloidal clay materials find their way into the drilling fluid either by being picked up from the formation during the drilling process, or by deliberate addition to the drilling fluid at the surface of the well. The colloidal clay materials can be divided into four mineral groups: montmorillonite; attapulgite; illite, a type of clay predominate in drilled formations and often called native clay; and kaolinite, sometimes called mother clay, a type of clay which is generally undesirable in that it imparts no useful flow properties to the drilling fluid. The presence of such colloidal clay material in a drilling fluid adds to the weight of the latter, as well as effecting the flow properties of the drilling fluid.

As mentioned hereinbefore, in the field of drilling fluids, the subject invention finds particular applicability in the flocculation of low solids drilling fluids, especially those containing relatively non-swellable or non-hydratable, low yield clay solids. However, the practice of the subject invention is not limited thereto but finds applicability in the flocculation of relatively high solids drilling fluids.

Although the flocculation phenomenon is rather obscure, and the subject invention is not limited to any theory of operation or reaction, it is thought that the two-component flocculating agent of this invention causes the dispersed or colloidal solid particles to group together or agglomerate into larger particles, bunches, or flocs of a tight, compact nature, the resulting sedimentation of these flocs appearing over a relatively short period of time. While the guar flour or acrylamide polymer materials do effect some flocculation of suspended solids in a fluid medium when they are used by themselves, we have discovered that the flocculation of a solids suspension can be surprisingly and materially increased by adding with the guar flour or acrylamide polymer the sodium salt of sulfonated dodecyl diphenyl oxide, this latter compound having no flocculating effect whatsoever when used by itself.

Guar flour, sometimes referred to as guar gum, is obtained from the guar plant, the latter being a legume known botanically as *Cyamopsis tetragonoloba*. Seeds of the guar plant have exceedingly hard and tough characteristics when dry, probably because of the presence of significant amounts of the polysaccharide, galactomannan. The seed coats of the seeds are generally removed by passing the seeds rapidly through a flame which very slightly scorches or sears the seed coat and permits it to be easily removed by a scouring or pearling operation. After removal of the germ by mechanical operation, the endosperm is ground to a fine, light, grey flour. Various commercially available guar flours are available, such as Galatasol and Jaguar. Guar flour can be effectively dispersed in either cold or hot water. High viscosity colloidal dispersions can be obtained at very low guar concentrations and it has from five to eight times the thickening power of starch. At such, guar flour can be very conveniently and readily prepared for use in the field.

The high molecular weight synthetic acrylamide polymers, which can be used in place of the guar flour according to this invention, are soluble in either fresh water or salt water, good dispersions being obtained by slowly sifting the polymer into the water during agitation. Useful acrylamide polymers of high molecular weight include polyacrylamide and copolymers of acrylamide and copolymerizable carboxylic acids having at least one carboxy group per molecule, such as acrylic acid. Applicable copolymerizable carboxylic acids include acrylic acid and various alpha and beta alkyl-substituted derivatives in which the alkyl group contains from one to eight carbon atoms, such as methacrylic acid, crotonic acid, alpha and beta ethyl-, propyl-, butyl-, hexyl- and octyl-acrylic acids, phenylacrylic acids, i.e., atropic and cinnamic acids; and vinylacrylic acids. The carboxy-containing monomer is usually employed in an amount in the range between 1 and 50 parts by weight, preferably between 10 and 50 parts by weight, per 100 parts total monomeric materials. Of the carboxy-containing monomers, acrylic acid and methacrylic acid are preferred because of their ready polymerization and commercial availability. Useful commercially available high molecular weight acrylamide polymers include Separan NP–10 and Separan 2610.

The other component of the flocculating agent or material of this invention, the sodium salt of sulfonated dodecyl diphenyl oxide, is also water soluble, as well as being soluble in acids, alkalies, and salts. At room temperature, 50 percent solutions of this material can readily be prepared. A commercially available sodium salt of this type is Dowfax 2A1.

The amount of the two-component flocculating agent to be used according to this invention will be dependent upon various factors, such as the particular solids suspension to be treated, the weight percent of solids in the suspension, the desired utility of the solids suspension itself, the type of solids suspended in the fluid medium, and other factors. Therefore, in the broader aspects of this invention we do not desire to specify any particular amount of the two-component flocculating agent to be used, but stated functionally the amount to be employed is that sufficient to cause substantial flocculation and sedimentation or settling of the suspended solids. Generally, in most applications, the total amount of the two-component flocculation agent of this invention to be used will vary between about 0.0125 and 7.5 pounds per barrel of solids suspension, preferably between 0.05 and 2.5 pounds per barrel. (All barrels referred to are 42 U.S. gallon barrels.) The relative weight ratio of the guar flour or acrylamide polymer to the sodium salt of sulfonated dodecyl diphenyl oxide can also vary and generally will be in the range between 0.25:1 and 15:1. A useful rule-of-thumb determination of the amounts to be used, based on the solids content of the system (assuming a solids specific gravity of 2.5) is to use one pound of guar flour to flocculate from 354 to 453 pounds of solids, and to use one pound of the acrylamide polymer to flocculate from 253 to 320 pounds of solids. For most applications, the amount of the guar flour or acrylamide polymer component to be used will be less than 0.5 pound per barrel of solids suspension, preferably from 0.1 to 0.5 pound per barrel. The corresponding amount of the other component, viz., the sodium salt of sulfonated dodecyl diphenyl oxide, will generally be less than 7.5 pounds per barrel of solids suspension, preferably in the range between 0.0025 and 7.5 pounds per barrel of solids suspension. The amount of solids which flocculate and settle will, of course, depend on the amount of flocculating agent added and the amount of solids in the system.

In treating well drilling fluids according to the practice of this invention, the two component flocculating agent of this invention can be added in any convenient manner at any desirable point in the mud circulation system. For example, the flocculating agent can be added as a mixture of dry powders or in the form of an aqueous solution by direct injection into the pump suction line, or can be introduced into the circulation system at the settling pit or the reserve mud pit. The flocculated and settled solids can be removed from the system by any conventional means, such as by settling out in the mud pits or by decanting the supernatant suspension from the settled solids. The flocculating treatment of this invention can be repeated as additional solids become colloidally suspended in the fluid medium. One of the advantages of this invention resides in the fact that because the flocculation of the solids suspension remains effective even if the flocculated system is subjected to agitation, the addition of the flocculating agent of this invention can be made at the pump suction, along with any other treating chemicals, and the treated drilling fluid circulated through the well during the drilling operation.

The following examples further illustrate the objects and advantages of this inventon, but it should be understood that in these examples the suspension treated, the specific ingredients, amounts, conditions, methods of addition, and other factors, are not to be construed as to unduly limit this invention, these examples being set forth merely for illustrative purposes.

EXAMPLE I

Samples of a water base drilling fluid containing native mud from Wise County, Texas, weighing 8.6 lbs./gal., were treated with various amounts of the novel two component flocculating agent of this invention. For purposes of comparison, similar drilling fluid samples were treated with the individual flocculation components. In each case, the additives were added to 250 cc. mud samples contained in graduated cylinders. The guar flour and the acrylamide polymer (Separan 2610) were added as 1 weight percent aqueous solutions, and the sodium salt of sulfonated dodecyl diphenyl oxide (Dowfax 2A1) was added as a 5 weight percent aqueous solution. After the addition, the cylinders were shaken and allowed to set for 15 minutes, after which the volume of the settled flocculated solids was read and recorded in cc., and also recorded was the volume percent of the total sample occupied by supernatant liquid. The results are tabulated in Table I.

*Table I*

FLOCCULATION OF WATER BASE DRILLING FLUIDS CONTAINING NATIVE MUD

| Sample | Additive added to drilling fluid (lbs./bbl.) | | | Vol. precipitate collected after 15 min. settling time (cc.) | Vol percent of supernatent liquid |
|---|---|---|---|---|---|
| | Guar flour | Acrylamide polymer | Sodium salt of dodecyl diphenyl oxide | | |
| 1 | 0.014 | | | 250 | 0 |
| 2 | 0.028 | | | 247 | 1.2 |
| 3 | 0.042 | | | 208 | 16.8 |
| 4 | 0.056 | | | 120 | 52 |
| 5 | 0.07 | | | 114 | 54.4 |
| 6 | 0.084 | | | 122 | 51.2 |
| 7 | | 0.014 | | 250 | 0 |
| 8 | | 0.028 | | 250 | 0 |
| 9 | | 0.042 | | 250 | 0 |
| 10 | | 0.056 | | 228 | 8.8 |
| 11 | | 0.07 | | 148 | 40.8 |
| 12 | | 0.084 | | 102 | 59.2 |
| 13 | | | 0.07 | 250 | 0 |
| 14 | | | 0.14 | 250 | 0 |
| 15 | | | 0.21 | 250 | 0 |
| 16 | | | 0.28 | 250 | 0 |
| 17 | | | 0.35 | 250 | 0 |
| 18 | | | 0.42 | 250 | 0 |
| 19 | 0.014 | | 0.07 | 245 | 2 |
| 21 | 0.028 | | 0.14 | 216 | 3.6 |
| 22 | 0.042 | | 0.21 | 107 | 57.2 |
| 23 | 0.056 | | 0.28 | 90 | 64 |
| 24 | 0.070 | | 0.35 | 94 | 62.4 |
| 25 | 0.084 | | 0.42 | 90 | 64 |
| 26 | | 0.014 | 0.07 | 250 | 0 |
| 27 | | 0.028 | 0.14 | 246 | 1.6 |
| 28 | | 0.042 | 0.21 | 189 | 24.6 |
| 29 | | 0.056 | 0.28 | 119 | 52.4 |
| 30 | | 0.070 | 0.35 | 103 | 58.8 |
| 31 | | 0.084 | 0.42 | 104 | 58.4 |

The above data show that whereas the sodium salt of sulfonated dodecyl diphenyl oxide did not cause any flocculation at all when used by itself, when this same additive was added in combination with either guar flour or the acrylamide polymer, the flocculation of the drilling fluid surprisingly increased to a marked extent.

The flocculating agents of this invention also proved effective in flocculating and settling various emulsion drilling fluids (5 percent diesel oil and 95 percent water) containing various clays such as McCracken, attapulgite, bentonite, Baroco (a montmorillonite clay), koalin, and the like.

Although we have illustrated our invention by showing its utility and application in the field of well drilling fluids, it should be understood that the subject invention is not necessarily limited thereto but is applicable wherever it is desired to flocculate solids colloidally suspended in a liquid medium. For example, these other fields of utility include those of water clarification, mining operations, ore processing, sewage plants, the ceramics industry, and the like. As such, various modifications and alterations of this invention will become apparent to those skilled in the art from the foregoing discussion and the subject invention should not be necessarily limited thereto.

We claim:

1. A method of treating a liquid system comprising solids colloidally suspended in a fluid medium comprising water, comprising adding thereto a flocculating agent comprising (1) the sodium salt of sulfonated dodecyl diphenyl oxide, and (2) one member of the group consisting of guar flour and an acrylamide polymer, said flocculating agent being employed in a small amount sufficient to effect flocculation of said suspended solids, wherein the relative weight ratio of one of said guar flour and acrylamide polymer to said sodium salt of sulfonated dodecyl diphenyl oxide is in the range between about 0.25:1 to 15:1, and separating resulting flocculated solids from said system.

2. The method according to claim 1 wherein said member is guar flour.

3. The method according to claim 1 wherein said member is an acrylamide polymer.

4. The method according to claim 1 wherein said member is polyacrylamide.

5. The method according to claim 1 wherein said member is a copolymer of acrylamide and acrylic acid.

6. The method according to claim 1 wherein said member is a copolymer of acrylamide and methacrylic acid.

7. The method according to claim 1 wherein the amount of said flocculating agent is in the range of 0.0125 and 7.5 pounds per barrel of liquid system.

8. A method of treating a drilling fluid comprising water and colloidally suspended clay solids, comprising adding to said drilling fluid a flocculating amount of a flocculating agent comprising (1) the sodium salt of sulfonated dodecyl diphenyl oxide, and (2) one member selected from the group consisting of guar flour and an acrylamide polymer, wherein the relative weight ratio of one of said guar flour and acrylamide polymer to said sodium salt of sulfonated dodecyl diphenyl oxide is in the range between about 0.25:1 to 15:1, and separating resulting flocculated solids from said drilling fluid.

9. The method according to claim 8 wherein said drilling fluid is a water base drilling fluid.

10. The method according to claim 8 wherein said drilling fluid is an oil-in-water emulsion drilling fluid.

11. The method according to claim 8 wherein said member is guar flour.

12. The method according to claim 8 wherein said member is an acrylamide polymer.

13. The method according to claim 8 wherein said member is polyacrylamide.

14. The method according to claim 8 wherein said member is a copolymer of acrylamide and acrylic acid.

15. The method according to claim 8 wherein said member is a copolymer of acrylamide and methacrylic acid.

16. The method according to claim 8 wherein the amount of said flocculating agent is in the range of 0.0125 and 7.5 pounds per barrel of drilling fluid.

17. A method of flocculating a drilling fluid comprising water and colloidally suspended solids, comprising adding to said drilling fluid from 0.0125 to 7.5 pounds per barrel of drilling fluid of a flocculating agent consisting essentially of (1) the sodium salt of sulfonated dodecyl diphenyl oxide, and (2) one member selected from the group consisting of guar flour and an acrylamide polymer, the relative weight ratio of said one member to said sodium salt being in the range between 0.25:1 to 15:1, and agitating the resulting mixture.

18. A liquid system comprising water, colloidally suspended solids and a flocculating agent comprising (1) the sodium salt of sulfonated dodecyl diphenyl oxide, and (2) one member of the group consisting of guar flour and an acrylamide polymer, wherein the relative weight ratio of one of said guar flour and acrylamide polymer to said sodium salt of sulfonated dodecyl diphenyl oxide is in the range between about 0.25:1 to 15:1.

19. A drilling fluid comprising water, colloidally suspended clay solids, and a flocculating agent comprising (1) the sodium salt of sulfonated dodecyl diphenyl oxide, and (2) one member of the group consisting of guar flour and an acrylamide polymer, wherein the relative weight ratio of one of said guar flour and acrylamide polymer to said sodium salt of sulfonated dodecyl diphenyl oxide is in the range between about 0.25:1 to 15:1.

20. A drilling fluid according to claim 19 wherein said member is guar flour.

21. A drilling fluid according to claim 19 wherein said member is an acrylamide polymer.

22. A drilling fluid according to claim 19 wherein said member is polyacrylamide.

23. A drilling fluid according to claim 19 wherein said member is a copolymer of acrylamide and acrylic acid.

24. A drilling fluid according to claim 19 wherein said member is a copolymer of acrylamide and methacrylic acid.

25. A drilling fluid comprising water, colloidally suspended clay solids, and about 0.0125 to 7.5 pounds per barrel of drilling fluid of a flocculating agent comprising (1) the sodium salt of sulfonated dodecyl diphenyl oxide, and (2) one member of the group consisting of guar flour and an acrylamide polymer, wherein the relative weight ratio of one of said guar flour and acrylamide polymer to said sodium salt of sulfonated dodecyl diphenyl oxide is in the range between about 0.25:1 and 15:1.

26. A drilling fluid consisting essentially of water, colloidally suspended clay solids, and from 0.0125 to 7.5 pounds per barrel of drilling fluid of a flocculating agent consisting essentially of (1) the sodium salt of dodecyl diphenyl oxide, and (2) one member selected from the group consisting of guar flour and an acrylamide polymer, the relative weight ratio of said one member to said sodium salt being in the range between 0.25:1 to 15:1.

References Cited in the file of this patent

UNITED STATES PATENTS

| | | |
|---|---|---|
| 2,315,951 | Fox et al. | Apr. 6, 1943 |
| 2,775,557 | Morgan | Dec. 25, 1956 |
| 2,854,407 | Mallory | Sept. 30, 1958 |

FOREIGN PATENTS

| | | |
|---|---|---|
| 725,460 | Great Britain | Mar. 2, 1955 |
| 760,653 | Great Britain | Nov. 7, 1956 |